(12) United States Patent
Ning

(10) Patent No.: US 7,869,141 B2
(45) Date of Patent: Jan. 11, 2011

(54) COMPACT FISHEYE OBJECTIVE LENS

(76) Inventor: Alex Ning, 2122 Sea Island Pl., San Marcos, CA (US) 92078

( * ) Notice: Subject to any disclaimer, the term of this patent is extended or adjusted under 35 U.S.C. 154(b) by 166 days.

(21) Appl. No.: 12/284,918

(22) Filed: Sep. 25, 2008

(65) Prior Publication Data
US 2009/0080093 A1 Mar. 26, 2009

Related U.S. Application Data

(60) Provisional application No. 60/995,373, filed on Sep. 25, 2007.

(51) Int. Cl.
*G02B 13/04* (2006.01)
(52) U.S. Cl. ...................... 359/753; 359/752
(58) Field of Classification Search ......... 359/749–753, 359/725
See application file for complete search history.

(56) References Cited

U.S. PATENT DOCUMENTS

| | | | | |
|---|---|---|---|---|
| 5,477,389 A * | 12/1995 | Ito et al. | ...................... | 359/752 |
| 6,687,061 B2 * | 2/2004 | Sensui | ......................... | 359/749 |
| 6,987,623 B2 * | 1/2006 | Shibayama | ................. | 359/691 |
| 7,280,289 B2 * | 10/2007 | Yamakawa | ................... | 359/771 |
| 7,286,302 B2 * | 10/2007 | Ohzawa et al. | .............. | 359/749 |
| 2005/0219715 A1 * | 10/2005 | Kimura et al. | .............. | 359/749 |
| 2008/0291542 A1 * | 11/2008 | Yamamoto | .................. | 359/651 |

* cited by examiner

*Primary Examiner*—Jordan M. Schwartz
(74) *Attorney, Agent, or Firm*—James F. Kirk

(57) ABSTRACT

A compact fisheye objective lens comprising a series of six lens elements arranged on an optical axis to focus an image on an image plane, the compact fisheye objective lens having a first lens element with a convex object surface that faces the object and a concave image surface that faces image plane, and a second lens element spaced to the right of the first lens element concave image surface, the second lens element having a concave object surface and a concave image surface. The compact fisheye objective lens having singlet third and fourth lens elements, the fifth and sixth lens elements being combined to form a doublet having a positive power.

3 Claims, 3 Drawing Sheets

COMPACT FISHEYE OBJECTIVE LENS

Figure 1:
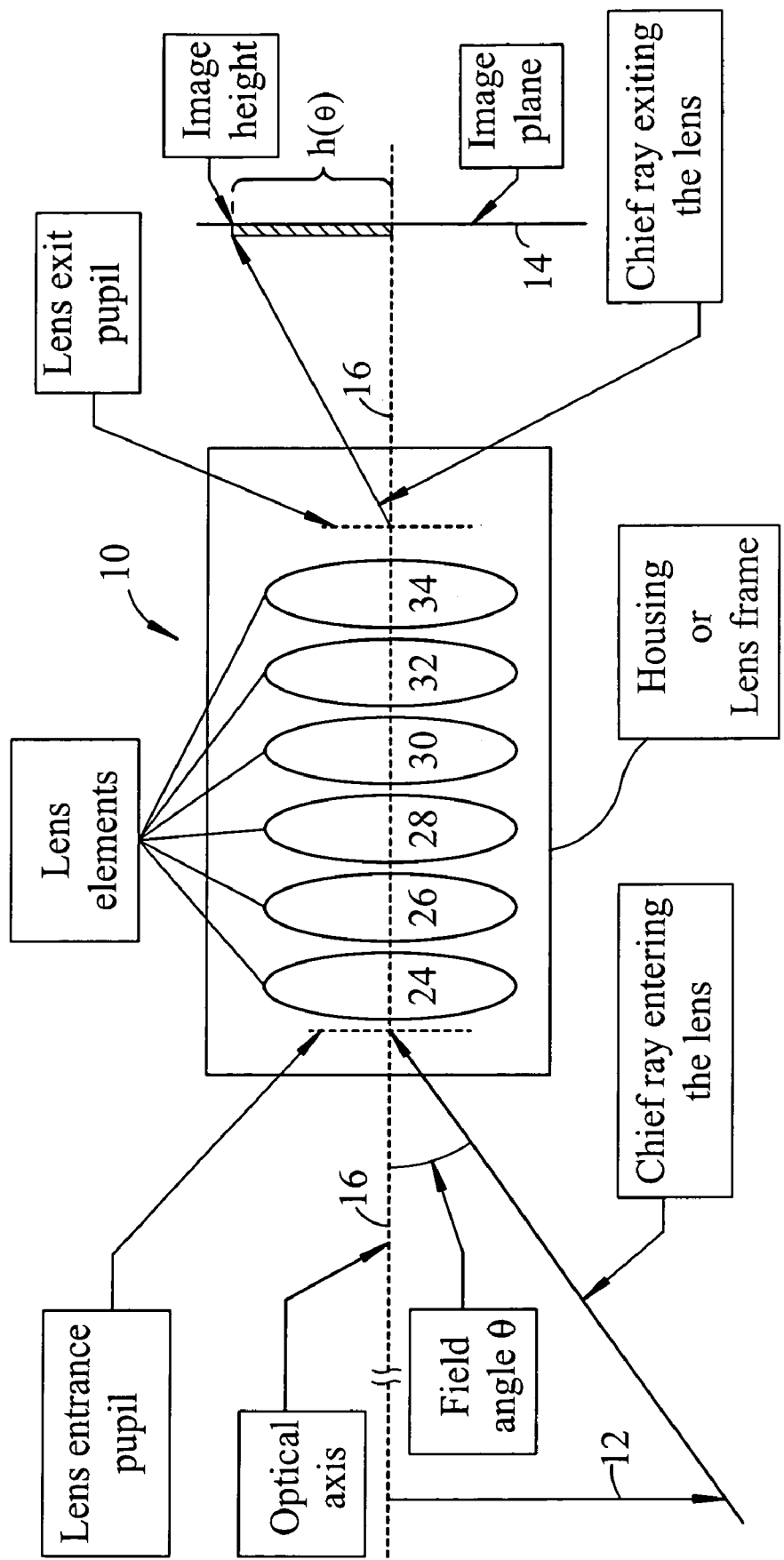

This application claims priority from U.S. provisional patent application 60/995,373 filed Sep. 25, 2007 for an Ultra-Wide Angle Imaging Lens having a common inventor.

FIELD OF THE INVENTION

This invention relates to compact lenses for digital camera applications and, in particular, to very wide angle or fisheye lenses for very compact digital cameras. Such lens designs are incorporated into security cameras and other very small electronic devices.

BACKGROUND OF THE INVENTION

Prior art fisheye lenses such as the DF1.8HB marketed by Fujinon in Japan use a large number of lens elements to obtain the performance requirements of a wide field of view, a large aperture and high image quality. However, the lens assembly is large, heavy and expensive to produce because of the large number of elements used. Additional examples of prior art fisheye lens designs are taught in U.S. Pat. Nos. 3,589,798; 3,597,049; 3,734,600; 3,737,214; 3,741,630; 4,412,726; 6,844,991; 7,173,776; 7,161,746; publication US 2005/0219715 A1 and also in JP Patents 63-017421, and 60-153018. The number of lens elements in the lenses taught by these references range from 8 to 15 elements whereas the invention taught by this application achieves similar results with only six lens elements thereby reducing complexity and cost.

In U.S. Pat. No. 7,023,628 issued on Apr. 4, 2006, this same or common inventor disclosed a compact fisheye lens with only six elements. In Japanese publications 04267212, 04068307 and 2002072085, various combinations of six element lenses were also disclosed. However, there is a need to further improve the optical performance of those lenses and/or reduce the manufacturing cost of them by offering less complex and an improved design such as that taught herein and below.

SUMMARY OF THE INVENTION

The present invention teaches an improved lens design of a compact fisheye objective lens with only six lens elements. The compact fisheye objective lens receives light from an object in object space and forms an image of the object on an image plane. The objective lens and the image plane are contemplated to be part of a camera system that derives a benefit and a sales advantage from very small size, high image quality and good low light performance.

Groups

The compact fisheye objective lens of this application has a front lens group (or first group) comprising 3 lens elements and a rear lens group (or second group) comprising another 3 lens elements. In the front group, the first lens element has a convex object surface that faces an object or a scene positioned in object space. The first lens element has a convex object surface that faces the object and a concave image surface that faces an image plane. A second lens element has a concave object surface that faces the object and a concave image surface that faces the image plane. A third lens element has a positive power.

The second lens group comprises a singlet element and a doublet (with two lens elements cemented together using suitable optical glue). The doublet lens is formed by cementing a positively powered lens element having convex object and image surfaces with a negative element having a concave object surface and a convex image surface.

This dimension "TT" is the track length or total height of the compact fisheye objective lens. TT designates the distance between the vertex of the first lens element convex object surface, and the image plane when the fisheye lens is focused at infinity. The symbol "f" designates the effective focal length of the compact fisheye objective lens assembly. It is an object of the invention. The reduction of the lens height "TT" is intentional to make it attractive for use in small portable appliances such as cell phones. In addition, the overall compact fisheye objective lens has a field of view that extends to 170 degrees and a track length to focal length ratio that is larger than 8 and less than 19.

BRIEF DESCRIPTIONS OF THE DRAWINGS

Figure 2:
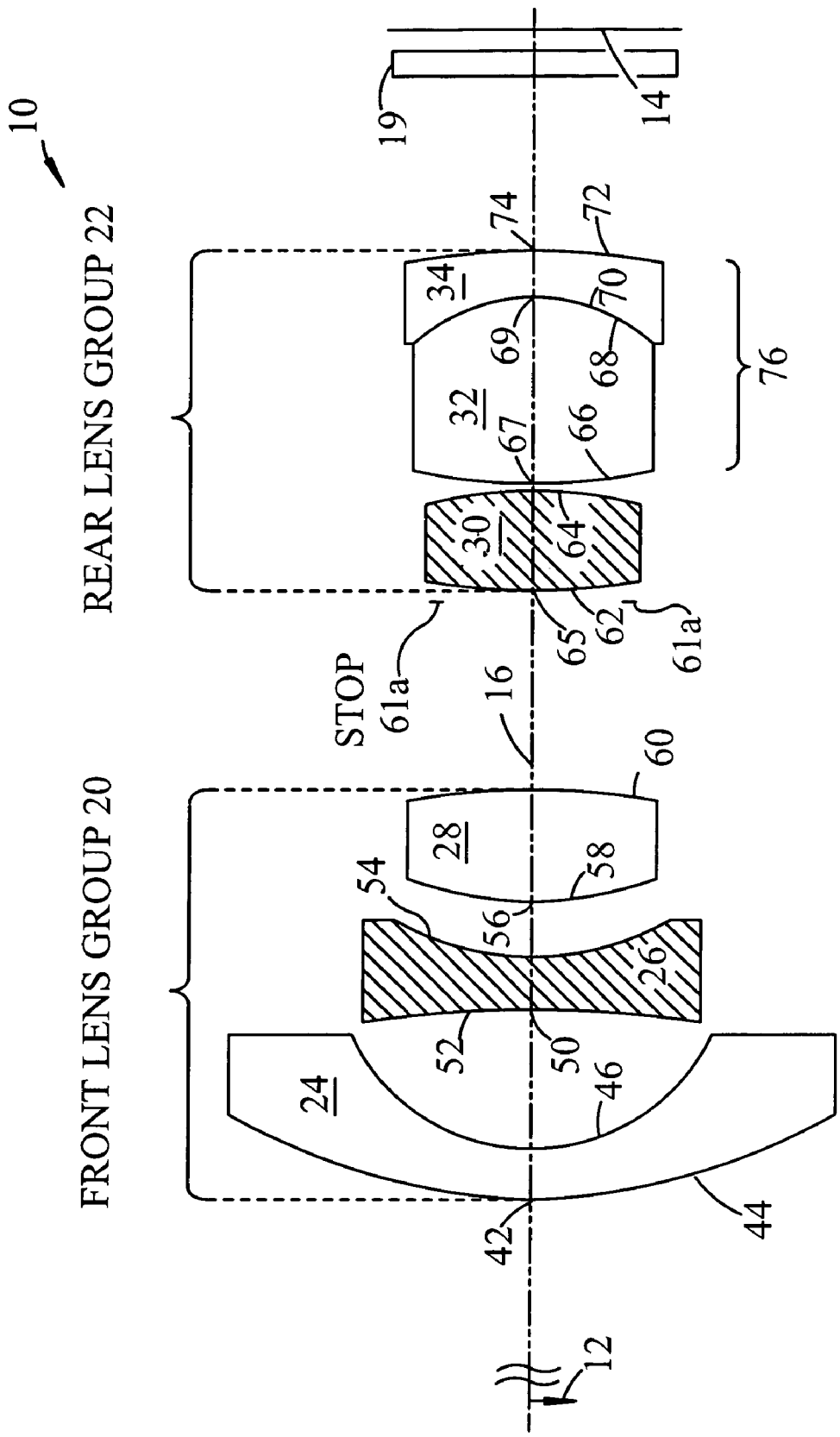
Figure 3:
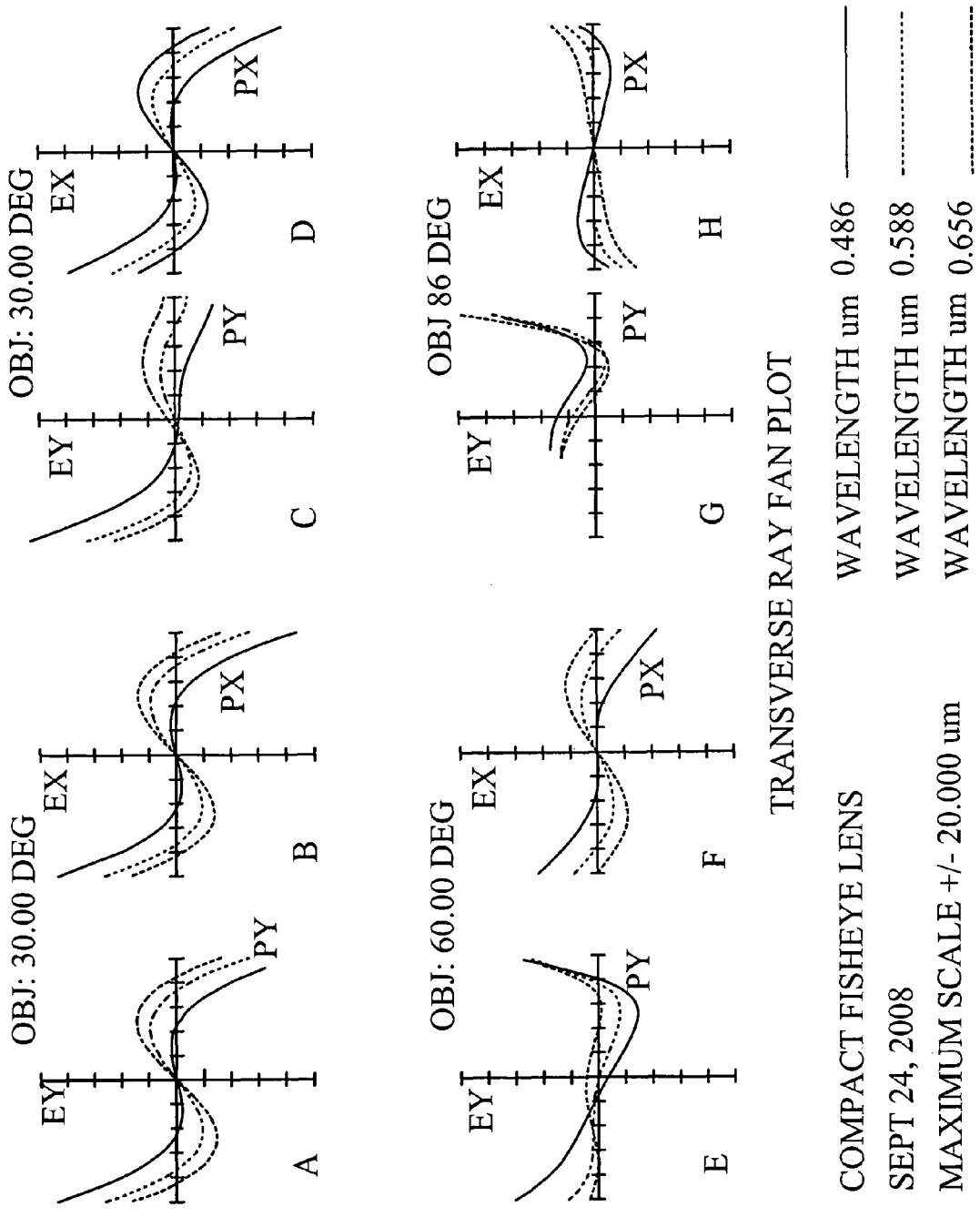

FIG. 1 is a schematic block diagram showing the path of a chief ray through the compact fisheye objective lens;

FIG. 2 discloses six element Compact Fisheye Objective Lens;

FIG. 3 represents transverse ray aberrations of a preferred embodiment of the Compact Fisheye Objective Lens in which the y-scale is 4 μm per division, the y-scale being the relative pupil coordinate; and Table 1 is a prescription for a preferred embodiment of the Compact Fisheye Objective Lens.

DISCLOSURE OF INVENTION

FIG. 1 schematically depicts the path of a chief ray through a six element compact fisheye objective lens and illustrates some of the terms used in the following characterization of a wide field of view fisheye objective lens. It is understood that imaging objective lenses that have an ultra wide field of view that have a full field of view >=100 ° up to 180° are fisheye lenses and are used in many applications such as security and surveillance applications. New emerging applications include back-up cameras for cars, and interior monitoring cameras for buses and airplanes. Prior art designs of wide-angle lenses tend to have a significant amount of optical distortion. Examples of similar related inventions include U.S. Pat. No. 7,023,628 for a Compact Fisheye Objective Lens issued to Alex Ning on Apr. 4, 2006, and U.S. Pat. No. 6,844,991 for a Fisheye Lens issued to Keiko Mizuguchi on Jan. 18, 2005.

The low light performance of an ultra-wide field of view compact fisheye objective lens is an important selling feature. The relative aperture of the lens must also be high. A lens relative aperture, also known as f/# (f number) of the lens, must typically be a value of 3.0 or less to be commercially competitive. There is also a need for small size and low weight for many emerging applications. The image quality of the lens must also be high for compatibility with mega pixel class electronic imagers.

Optical distortion of any lens can be characterized by its image height vs. field angle. FIG. 1 schematically shows several of these variables. The compact fisheye objective lens 10 is represented by a block containing six lens elements coaxially aligned on a common optical axis 16. An object 12 resides in object space to the left and a ray moving from its extreme tip to the lens pupil.

A chief ray is shown entering the pupil at a field angle θ (theta). The ray then passes through six lens elements and emerges at the exit pupil to form the tip of the image on the image plane 14. The off-axis image height h is defined as the distance between the interception of an off-axis ray with the image plane, and the optical axis. As shown in FIG. 1, the field angle is the angle θ between the off-axis chief ray and the optical axis. The image 14 plane is defined as the best focal plane when the object is at infinite distance from the lens.

FIG. 1 illustrates the image height "h" that is produced on a focal or image plane by rays processed from an object to the pupil of a compact fisheye objective lens and then to an image plane as a function of field angle θ where θ is the angle that a chief ray makes with the optical axis of the lens and where the chief ray is propagating from an extreme point on the object to the center of the lens pupil. In a distortion free lens (also known as a rectilinear lens), the height of the image on the image plane is a function of the angle θ as characterized below in Equation 1.

$$h(\theta) = f^* \tan(\theta) \quad \text{Eq. 1.}$$

In Equation 1, the parameter "f" represents the effective focal length (EFL) of the lens. Most standard photographic lenses follow this relationship. However, as the field of view required increases, it becomes more difficult or impossible to design lenses that satisfy Equation 1. Objective or fisheye lenses that capture an ultra wide-angle image, are better characterized by Equation 2 as follows:

$$h(\theta) = f^*(\theta) \quad \text{Eq. 2.}$$

The angle θ in Equation 2 is given in radians. If an objective lens satisfies Equation 2, the lens is referred to as an "f-θ" lens. It should be understood that an image formed by a perfect "f-θ" lens will also be distorted. The image height "h" obtained by the above listed fisheye lenses including the image produced by the objective lens of U.S. Pat. No. 7,023,628 for a Compact Fisheye Objective lens that issued to Alex Ning, (the common inventor on Apr. 4, 2006) satisfy Equation 3, below:

$$h(\theta) < f^*(\theta) \text{ for } \theta > 0 \quad \text{Eq. 3.}$$

Fisheye lenses are lenses capable of imaging over a wide angle of view up to about 180°. Fisheye lenses are commonly used for security and surveillance applications. New emerging applications include back-up cameras for cars, and interior monitoring cameras for buses and airplanes. Since low light performance of an objective lens is important, the relative aperture of the lens must also be high. Lens relative aperture (also known as f/# (f number) of the lens) having values of less than or equal to 3 is generally preferred. There is also a need for small size and low weight for many emerging applications. The image quality of the lens must also be high for compatibility with mega pixel class electronic imagers.

It is a present objective of the invention described herein to provide a level of performance that exceeds that of the prior art by meeting the requirements of Equation 4 below such that:

$$h(\theta) > f^*(\theta) \text{ for } \theta > 0 \quad \text{Eq. 4.}$$

The benefit of a lens that meets the requirements of Equation 4 lens is that it will refract the light rays from an off-axis object in such a way that the off axis objects are less "squeezed" than that of lenses satisfying Equation 3 above. A camera system using a lens designed to be in compliance with Equation 4 conveys more off-axis information and is known as "tailored distortion" lenses.

A second performance objective in the design is to achieve excellent optical performance of up to 180° field of view and having a f/# as low as 2.0 and with a minimum number of lens elements.

FIG. 2 shows a preferred embodiment of the compact fisheye objective lens that begins the disclosure of a first embodiment of a new and improved compact fisheye objective lens 10 that receives light from an imaginary object 12 in object space (left side of the figure) from which it forms an image (not shown in FIG. 2) of the object 12 on an image plane 14 (right side of FIG. 2). In identifying the surfaces of the lens elements in FIG. 2, the word "object" is used as an adjective before the word "surface" to identify a surface that faces the imaginary object positioned at the left of the FIG. 2. The word "image" is used as an adjective before the word "surface" to identify a surface that faces the image plane.

An embodiment in which the lens elements are made to the prescription of Table 1 below is a high performance compact fisheye objective lens.

TABLE 1

OPTICAL PRESCRIPTION

| Surface | Radius | Thickness | Index (nd) | Abbe# |
|---------|--------|-----------|------------|-------|
| OBJ | Infinity | Infinity | | |
| 1 | 9.190968 | 0.8 | 1.910418, | 35.4743 |
| 2 | 3.100648 | 2.195489 | | |
| 3 | −19.63967 | 0.75 | 1.754999, | 52.31823 |
| 4 | 3.090817 | 1.139523 | | |
| 5 | 9.796694 | 1.6 | 1.805237, | 25.42571 |
| 6 | −9.796694 | 3.072802 | | |
| STO | Infinity | 0.2562988 | | |
| 8 | 19.56948 | 1.5 | 1.729159, | 54.65891 |
| 9 | −6.533188 | 0.1 | | |
| 10 | 7.997446 | 3 | 1.729159, | 54.65891 |
| 11 | −2.8 | 0.75 | 1.922860, | 20.88038 |
| 12 | −10.19164 | 2.776037 | | |
| 13 | Infinity | 0.4 | 1.516800, | 64.16734 |
| 14 | Infinity | 0.375 | | |

Referring now to the preferred embodiment of FIG. 2, the lens elements shown are sequentially numbered moving from left to right on FIG. 2. The lens elements are co-axially aligned on the optical axis 16. Six lens elements are shown divided into a front lens group 20 of three lens elements and a rear lens group 22 of three lens elements. The front lens group has a first lens element 24, a second lens element 26 and a third lens element 28. The rear lens group 22 has a fourth lens element 30, a fifth lens element 32 and a sixth lens element 34. Cover lens element 18 is described as having object and image surfaces that are flat on rows 13 and 14 of Table 1. The cover or filter element 19 provides protection for the image plane 14. The filter element properties for use in a preferred embodiment are characterized on rows 13 and 14 of Table 1.

The first lens element 24 is the outermost lens element on the left side of FIG. 2 and the sixth lens element 34 is the outermost lens element on the right side of the FIG. 2. Table 1 shows the optical prescription for an embodiment of the compact fisheye objective lens that meets the design objectives of the invention compact fisheye objective lens 10.

The compact fisheye objective lens 10 of FIG. 2 first lens element has an object surface vertex 42 positioned on the optical axis 16. The first lens element has a convex object surface 44 that faces the object 12 and a concave image surface 46 that faces image plane 14.

The second lens element 26 is shown spaced to the right of the first lens element 24 with its object surface vertex 50 on the optical axis 16. The second lens element 26 has an object surface 52 that is preferably concave, but might be convex, or flat. The second lens element has a concave image surface 54. The second lens element has a negative power. The second element in the design shown in U.S. Pat. No. 7,023,628 has an object surface that is either convex or flat so the present compact fisheye objective lens departs from the art by making the second lens element object surface concave which results in an improvement in performance.

In the preferred embodiment of FIGS. 2 and 3 and Table 1, the second lens element 26 satisfies the following conditions:

$$|R2,o|>|R2,i|, \text{ and } 1.8<|f2|/|f|<2.8 \qquad \text{Eq. 5}$$

where $R2,o$ denotes the radius of curvature of the second lens element object surface 52, $R2,i$ denotes the radius of curvature of the second lens element image surface 54. The variable "f2" is the effective focal length of the second lens element The variable "f" is the effective focal length of the entire lens assembly. The lens design of Table 1 shows an example of the absolute value radius of the second lens element object surface 52 being greater than the absolute value of the radius of the second lens element image surface 54. The ratio of the focal length of the second lens element 26 to that of the focal length of the compact fisheye objective lens 10 was tested using a modeling program such as those described below to confirm that the ranges of Eq. 5 provide suitable performance.

The third lens element 28 is shown spaced to the right of the second lens element 26 with its object surface vertex 56 on the optical axis 16. The third lens element has a convex object surface 58 and a convex image surface 60. The third lens element has a positive power.

The front lens group 20 has a negative power. The focal length of this group satisfies the following condition:

$$2.6<|f1,2,3|/|f|<3.2 \qquad \text{Eq: 6}$$

where the variable "f 1,2,3" denotes the effective focal length of the front lens group 20 and as above, the variable "f" is the effective focal length of the entire lens assembly, that being the compact fisheye objective lens 10. The ratio of the focal length of effective focal length of the front group to that of the focal length of the compact fisheye objective lens 10 was tested using a modeling program such as those described below to confirm that the ranges of Eq. 6 will provide suitable performance.

The focal length of the first lens element 24 and the second lens element 26 in the front lens group 20 satisfies the following condition:

$$0.8<|f1,2|/|f|<1.5 \qquad \text{Eq. 7}$$

where the variable "f 1,2" denotes the combined effective focal length of the first lens element 24 and the second lens element 26. The ratio of the focal length of the first lens element 24 and the second lens element 26 as a pair, to that of the focal length of the compact fisheye objective lens 10 was tested using a modeling program such as those described below to confirm that the ranges of Eq. 7 will provide suitable performance.

The rear lens group 22 is positioned to the right of the third lens element 28 in the front group in FIG. 2. The rear lens group 22 has a positive power. As shown in FIG. 2, the fourth lens element 30 is positioned to the right of the third lens element 28 and is the left most lens element in the rear lens group 22.

An aperture STOP 61a, 61b is shown in section positioned between the third lens image surface 60 and the fourth lens convex object surface 62. Row 7 in Table 1 provides the properties of the STOP for the embodiment of Table 1.

The fourth lens element is a singlet lens with a positive power. The fourth lens element, as shown in FIG. 2, has a convex object surface 62 and a convex image surface 64. The fourth lens element object surface vertex 65 is shown on the optical axis 16. The fourth lens element satisfies the following condition:

$$|R4,o|>|R4,i| \qquad \text{Eq. 8}$$

where the variable "$R4,o$" denotes the radius of curvature of the object surface of fourth lens element 62 and the variable "$R4,i$" denotes the radius of curvature of the fourth lens element image surface 64. Table 1 shows an example in which the fourth lens element, shown as surface rows 8 and 9 has an absolute object surface radius of 19.56948 that exceeds that of its image radius 6.53318. The radius of the fourth lens element 30 object surface 62 is larger than the radius of fourth lens element 30 image surface 64 in the compact fisheye lens of Table 1. The radius of each surface is determined using a modeling program such as those described below to confirm that the ranges of Eq. 8 will provide suitable performance.

The fifth lens element 32 has a bi-convex shape. The fifth lens element 32 has an object surface vertex 67 on the optical axis 16. The fifth lens element 32 also has a convex object surface 66 and a convex image surface 68. The fifth lens element has a positive power.

The sixth lens element 34 has a concave object surface. The sixth lens concave object surface has vertex 69 common with the fifth lens convex image surface vertex 69 both being on the optical axis 16. The sixth lens concave object surface is characterized by row 11, with the image surface 72 being characterized on row 12 of Table 1. The sixth lens element 34 convex image surface 72 is shown to have a radius of −10.19164 on row 12 of Table 1. The sixth lens element has a negative power but the doublet 76 formed from the fifth and sixth lens has a positive power.

The Doublet

The fifth lens element 32 and sixth lens elements 34 form the cemented doublet 76. The cemented doublet 76 is formed by gluing the fifth lens element convex image surface 68 to the sixth lens element concave object surface 70. The sixth lens element image surface vertex 74 is shown on the optical axis 16. The cemented doublet 76 has a positive power.

As can be seen in Table 1, the performance of the claimed design depends on the selection available glass materials having carefully selected index of refraction and Abbe number values.

Abbe or V Number

The symbol for the Abbe Number in the following equations is the letter V. The Abbe Number for a type of glass provides an indication of how much dispersion a ray of light will experience passing through the medium of a lens formed from the material which is directly proportional to the chromatic quality of a lens. The value is measured with light at the three wavelengths of the Fraunhofer lines 486.1, 587.6, and 656.3 nanometers respectively. Abbe number of a glass mixture are controlled and typically range between 20 and 60. However glass mixtures have been evaluated with refractive indices of refraction ranging from 1.46 to 1.97 which have V-numbers that range from 20 to 85. However, glass with lower Abbe numbers may become available in the future. A range of Abbe number in Eq. 9 or Eq. 10 below that extends below a finite numerical upper limit to an unspecified lower limit is meant to include Abbe number as low as are known to be attainable.

The invention compact fisheye objective lens characterized herein requires the designer to search, match and locate the V number of available glass materials as well as index of refraction values for glass materials for a lens design. The inequality expressions that follow in Eq. 9, 10 and 11 below aid the designer in selecting an optical material from those commercially available by knowing the V-number range constraints along with particular glass data such as refractive index data while successive designs with the assistance of modeling software as will be referenced below.

Returning now to the design of the compact fisheye objective lens, the 6th lens element 34 is preferably made from a material having a low Abbe number as follows:

$$V6<30 \qquad \text{Eq. 9}$$

where the variable "V6" is the Abbe number of the sixth lens element 34. Even better performance can be achieved if:

$$V6<25 \qquad \text{Eq. 10}$$

Surface 11 in Table 1 shows the Abbe number of the sixth lens element to be 20.88038. That value demonstrates that the limitations of both Eq. 9 and 10 are met by the expressions of Eq. 9 and 10. The performance of the design was tested within the limits of Eq. 9 and 10 using Abbe numbers for the glass extending up to the limits of 25 and 30 using a modeling program such as those described above to confirm that the ranges of Eq. 9 and 10 provide suitable performance.

Better off-axis chromatic aberration can be achieved if:

$$a.\ |V3-V6|<10 \qquad \text{Eq. 11.}$$

where the variable "V3" is the Abbe number of the third lens element. Table 1 shows the Abbe number of the third lens element on line 5 as being 25.42571 and the Abbe number of the sixth lens element on surface 11 as being 20.88038. The absolute difference in the two Abbe numbers is 4.54723 which is well below the limit of 10 in Eq. 11. Performance of the compact fisheye objective lens was tested using a modeling program such as those described below to confirm that the ranges of Eq. 11 will provide suitable performance.

An important goal of the design of the compact fisheye objective lens is the reduction of the lens height "TT" to make it attractive for use in small portable appliance such as cell phones. The overall lens assembly satisfies the following condition:

$$8<TT/f<19 \qquad \text{Eq. 12.}$$

where the variable "TT" is the total track length or total height of the compact fisheye objective lens defined as the distance from the first lens element front vertex on its object surface to the image plane when the overall lens assembly is focused at infinity and the variable "f" is the effective focal length of the entire assembly as defined earlier.

The present invention compact fisheye objective lens achieves excellent image quality for a compact lens having a wide field of view and large relative aperture. The optical prescription as shown in Table 1 provides a field of view about 170°, and an f/#=2. The expression or term "F/#" is meant to mean, the "f number" of the lens. The "f number" is typically understood to mean the ratio of the effective focal length to the entrance pupil diameter. Due to lens tolerances, the term approximately means a range centered at 170 degrees, with a lower limit of 165 degrees and an upper limit of 175 degrees with a highest expectation at or very near to 170 degrees or slightly above that value as tolerances are tightened.

The image quality of this design can be modeled by several commercial optical software packages (examples include: Code V marketed by Optical Research Associates in Pasadena, Calif. and Zemax marketed by Zemax Corporation in Seattle, Wash.). The modeled performance of the design of FIG. 2, using the prescription of Table 1, appears in four pairs of graphs on FIG. 3.

FIG. 3 shows the eight graphs labeled A, B, C, D, E, F, G and H which are arrayed in four pair. The independent variable (horizontal axis) is the relative coordinate of a ray over the pupil diameter. The vertical axis has a maximum distance measure of +/−20 um (each tic mark is 4 um). It represents the transverse ray aberration (ray interception distance from the ideal focal point) of a ray passing through a specific relative pupil position.

Graphs A (tangential plane) and B (saggital plane) show the transverse ray aberrations for an on-axis ray bundle. Graphs C and D to the right of Graphs A and B show the performance of the lens for a ray bundle at 30 degrees off-axis. On the second row, starting on the left, Graphs E and F increase the incident angle to 60 degrees while Graphs G and H to the right of center show the performance when the light source is moved to an incident angle of 85 degrees with respect to the optical axis 16 of the compact fisheye objective lens 10. Three curves appear on each of the eight graphs. Each of the curves shows the performance of the lens at a different wavelength, typically selected and rounded off to match the Fraunhofer lines of 486.1, 587.6, and 656.3 nanometers respectively.

While certain specific relationships, materials and other parameters have been detailed in the above description of preferred embodiments, those can be varied, where suitable, with similar results. Other applications and variations of the present invention will occur to those skilled in the art upon reading the present disclosure. Those variations are also intended to be included within the scope of this invention as defined in the appended claims.

What is claimed is:

1. A fisheye objective lens having a series of lens elements aligned coaxially into a front group and a rear group and spaced on an optical axis to focus the image of an object on an image plane, each lens element surface being characterized as an object surface if facing the object, or characterized as a image surface if facing the image plane, the front group comprising:

a first lens element, being the first most object side lens element of the front group, with a convex object surface and a concave image surface, a second lens element, being the second most object side lens element of the front group, with a concave object surface and a concave image surface, and a third lens element, being the third most object side lens element of the front group, the compact fisheye objective lens having a total track length "TT" and an effective focal length f, the elements in the front and rear groups being spaced along the optical axis to obtain a ratio of the distance "TT" to the effective focal length "f" of the fisheye objective lens as being greater than eight and less than nineteen, and wherein the rear group further comprises:

a fourth lens element, being the first most object side lens element of the rear group, having a convex object surface and a convex image surface, a fifth lens element, being the second most object side lens element of the rear group, having a convex object surface and a convex image surface, and a sixth lens element, being the third most object side lens element of the rear group, having a concave object surface and a convex image surface and wherein, the sixth lens element has an Abbe number less than 30.

2. The fisheye objective lens of claim 1 wherein:

the second and sixth lens elements are negatively powered and the third, fourth and fifth lens elements are positively powered.

3. A fisheye objective lens having a series of lens elements aligned coaxially into a front group and a rear group and spaced on an optical axis to focus the image of an object on an image plane, each lens element surface being characterized as an object surface if facing the object or characterized as a image surface if facing the image plane, the front group comprising:
- a first lens element, being the first most object side lens element of the front group, with a convex object surface and a concave image surface,
- a second lens element, being the second most object side lens element of the front group, with a concave object surface and a concave image surface,
- a third lens element, being the third most object side lens element of the front group, having a convex object surface and a convex image surface, the rear group comprising,
- a fourth lens element, being the first most object side lens element of the rear group, having a convex object surface and a convex image surface,
- a fifth lens element, being the second most object side lens element of the rear group, having a convex object surface and a convex image surface, and
- a sixth lens element, being the third most object side lens element of the rear group, having a concave object surface and a convex image surface, and wherein the six lens elements are defined by the prescription of Table 1 as follows:

TABLE 1

| \multicolumn{5}{c}{OPTICAL PRESCRIPTION} |
| Surface | Radius | Thickness | Index (nd) | Abbe# |
|---|---|---|---|---|
| OBJ | Infinity | Infinity | | |
| 1 | 9.190968 | 0.8 | 1.910418, | 35.4743 |
| 2 | 3.100648 | 2.195489 | | |
| 3 | −19.63967 | 0.75 | 1.754999, | 52.31823 |
| 4 | 3.090817 | 1.139523 | | |
| 5 | 9.796694 | 1.6 | 1.805237, | 25.42571 |
| 6 | −9.796694 | 3.072802 | | |
| STO | Infinity | 0.2562988 | | |
| 8 | 19.56948 | 1.5 | 1.729159, | 54.65891 |
| 9 | −6.533188 | 0.1 | | |
| 10 | 7.997446 | 3 | 1.729159, | 54.65891 |
| 11 | −2.8 | 0.75 | 1.922860, | 20.88038 |
| 12 | −10.19164 | 2.776037 | | |
| 13 | Infinity | 0.4 | 1.516800, | 64.16734 |
| 14 | Infinity | 0.375. | | |

* * * * *